Nov. 19, 1968  H. J. BROWN  3,412,308
CURRENT AND VOLTAGE RESPONSIVE BATTERY CHARGING CIRCUIT
Filed Sept. 27, 1965
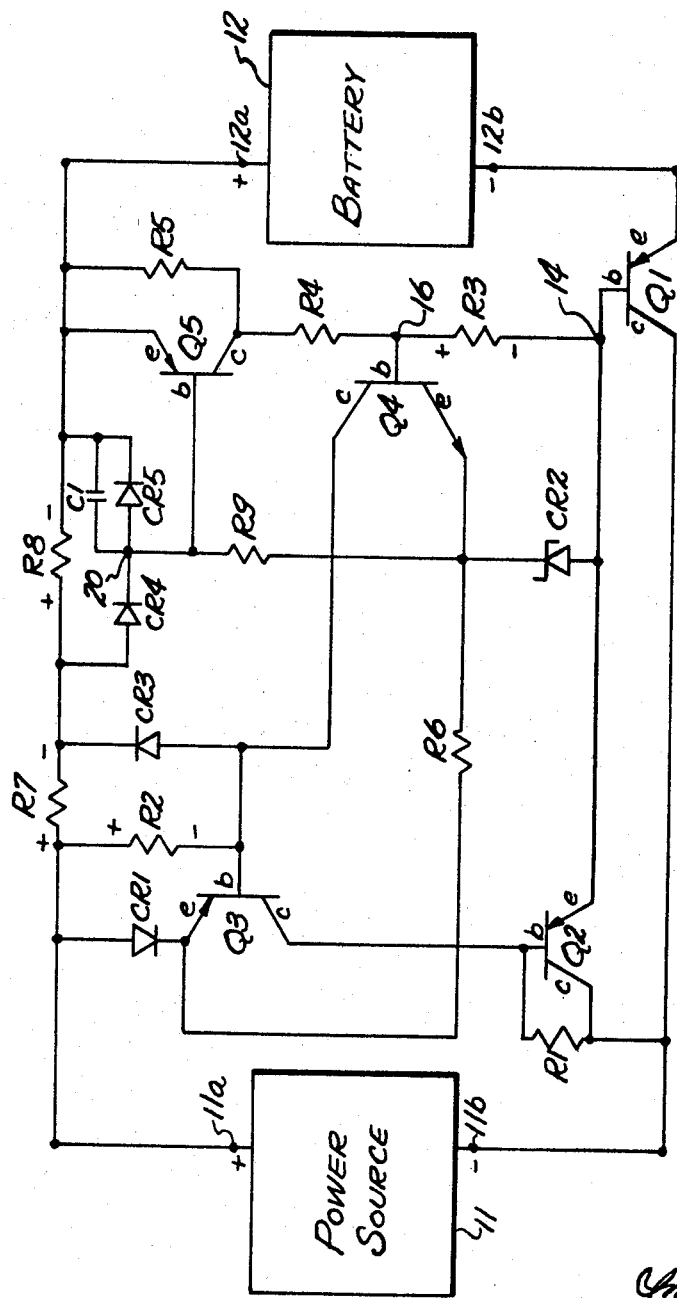
Inventor
Harold J. Brown
By Pendleton, Neuman,
Seibold & Williams
Attorneys United States Patent Office 3,412,308
Patented Nov. 19, 1968

3,412,308
CURRENT AND VOLTAGE RESPONSIVE
BATTERY CHARGING CIRCUIT
Harold J. Brown, Indianapolis, Ind., assignor to Globe-Union Inc., Milwaukee, Wis., a corporation of Delaware
Filed Sept. 27, 1965, Ser. No. 491,078
6 Claims. (Cl. 320—24)

ABSTRACT OF THE DISCLOSURE

A battery charging circuit is shown which includes a transistor voltage regulator which controls the current delivered to the battery in response to a voltage developed across a resistive divider network connected across the battery terminals. The transistor regulator does not become operative until the voltage of the battery exceeds a predetermined level; prior to this, full charging current is supplied to the battery. Current to the battery is sensed and means are provided for limiting the maximum current to a safe level and for adjusting a float current level for a fully charged battery in response to sensing a predetermined minimum charging current.

---

The present invention relates in general to a battery charging circuit and more specifically to a transistorized battery charging circuit which (1) initially charges a battery at a maximum rate, (2) charges a battery at a regulated rate dependent upon the charge on the battery once a prescribed charge is attained on the battery, and (3) holds the battery at a specified float voltage level once full charge is attained on the battery.

A primary object of the present invention is to provide a new and improved battery charging circuit. A related object is to provide a new and improved transistorized battery charging circuit.

A more specific object of the present invention is to provide a new and improved battery charging circuit which (1) initially charges a battery at a maximum rate, (2) charges the battery at a regulated rate dependent upon the charge on the battery once a prescribed charge is attained thereon, and (3) holds the battery at a specified float voltage level once full charge is attained thereon. Another object is to provide such a battery charging circuit which limits the maximum amount of charging current that may be drawn so as to remove any uncertainties associated with an uncontrolled current output.

A general object of the present invention is to provide a new and improved battery charging circuit which functions consistently when standard components are employed therein. A related object is to provide such a battery charging circuit which does not require critical preselection of components for use therein.

Other objects and advantages of the present invention will become apparent upon reading the attached detailed description of the invention taken in conjunction with the drawing.

In one form of the present invention, a battery charging circuit is provided which includes a source of charging current and is electrically connected across a battery to be charged. Means are interposed between the source and the battery for limiting the flow of current to a prescribed maximum level. Additionally, means are provided which respond to a prescribed intermediate charge being attained on the battery for thereafter causing current to be supplied to the battery at a regulated rate dependent upon the charge on the battery until full charge is attained thereon. Finally, means are provided for responding to full charge being attained on the battery for causing current to be supplied to the battery to maintain the battery at a specified float voltage.

For the purpose of providing a detailed description of the present invention, reference will be made to the drawing wherein a schematic diagram is shown of a battery charging circuit constructed in accordance with the teachings of the present invention.

While the invention has been shown and will be described in some detail with reference to a particular exemplary embodiment thereof, there is no intention that it be limited to such detail. Quite to the contrary, it is intended here to embrace all modifications, alternatives, and equivalents falling within the spirit and scope of the invention as defined by the appended claims.

Referring now to the drawing, a battery charging circuit is shown which is constructed in accordance with the teachings of the present invention. The battery charging circuit includes a D.C. power source 11 and is electrically connected to a battery 12 which is to be charged thereby. The power source 11 may, for example, be an A.C. rectified power supply. As may be seen, the positive terminal 11a of the power source 11 is electrically connected to the positive terminal 12a of the battery 12 through components forming a part of the charging circuit and the negative terminal 11b of the power source is in like manner electrically connected to the negative terminal 12b of the battery through components of the charging circuit.

In the exemplary arrangement, a transistor Q1 is provided for controlling the flow of charging current through the battery 12, As may be seen, the transistor Q1, which is disclosed as being of the PNP type, has its emitter-collector circuit disposed between the negative terminals 11b and 12b respectively of the power source and the battery. A PNP type transistor Q2, associated with the base circuit of the transistor Q1, is provided to control the operation of the transistor Q1. In the exemplary arrangement, conduction of the transistor Q1 is directly dependent upon conduction of the transistor Q2. As may be seen, the emitter of transistor Q2 is connected to the base of transistor Q1, whereas the collector of transistor Q2 is connected to the negative terminal 11b of the power source. Additionally, the base of the transistor Q2 is connected to the collector thereof, and thus is likewise connected to the negative terminal 11b of the power source, through a drive resistor R1. Moreover, the junction 14 between the emitter of transistor Q2 and the base of transistor Q1 is connected to the positive terminal 12a of the battery 12 through a voltage dividing network consisting of resistors R3, R4 and R5.

In the absence of a control signal being applied to the base of transistor Q2, the base of transistor Q2 is biased negative with respect to the emitter thereof so that transistor Q2 is maintained in its maximum conductive state. Under such conditions, maximum current is drawn by transistor Q2 through the emitter-base circuit of the transistor Q1 which causes the base of transistor Q1 to likewise be biased negative with respect to the emitter thereof so that transistor Q1 is likewise maintained in its maximum conductive state. It follows that maximum charging current is drawn by the transistor Q1 from the source 11 through the battery 12 which causes the battery to be charged at a maximum rate.

For the purpose of causing a variable control signal to be applied to the base of transistor Q2 to control the conduction thereof, whereby the conduction of transistor Q1 is controlled, a PNP type transistor Q3 is associated with the base circuit of the transistor Q2. As may be seen, the emitter of transistor Q3 is connected to the positive terminal 11a of the power source through a diode CR1, the collector thereof is connected to the base of transistor Q2 and thus is connected to the negative terminal of the power source through the drive resistor R1, and the base thereof is connected to the positive terminal 11a of the power source through a biasing resistor R2. When the transistor Q3 is nonconductive, the transistor Q2 is in its maximum conduction state since the base of transistor Q2 is connected to the negative terminal 11b of the power source 11 through the drive resistor R1 and a maximum negative bias is applied to the base of transistor Q2. Under these conditions, the base of transistor Q2 is essentially connected directly to terminal 11b. On the other hand, when transistor Q3 is conductive, current is drawn through its emitter-collector circuit which flows through the resistor R1 and drives the base of transistor Q2 more positive with respect to the emitter thereof. Under these latter conditions, transistor Q2 is less conductive and transistor Q1 is likewise less conductive so that less charging current is drawn through the battery 12. Moreover, it will be readily apparent that, as transistor Q3 becomes more and more conductive, transistors Q2 and Q1 correspondingly become less and less conductive so that less and less charging current is drawn through the battery 12. In other words, the flow of charging current through the battery 12 may be regulated by controlling the condition of transistor Q3.

In the exemplary arrangement, the operation or conduction of transistor Q3 is controlled by an NPN type transistor Q4 associated with the base circuit thereof. The transistor Q4 has its collector connected to the base of transistor Q3, has its emitter connected to the junction of reference resistor R6 and Zener diode CR2, and has its base connected to the junction 16 of the resistors R3 and R4 in the voltage dividing network. Additionally, the collector of transistor Q4 is connected to the positive terminal 11a of the power source through the biasing resistor R2 and its emitter is connected to the junction 14 between the emitter of transistor Q2 and the base of transistor Q1 through Zener diode CR2. The transistor Q4 functions to control the flow of current through resistor R2 so that the biasing of the base of transistor Q3 and thus the conduction of transistor Q3 is controlled thereby. Conduction of transistor Q4 is dependent upon the voltage drop across resistor R3, and the voltage drop across resistor R3 must exceed the sum of the fixed Zener voltage of CR2 and the substantially constant base emitter voltage of the transistor Q4 before transistor Q4 is rendered conductive. The voltage across CR2 is fixed because a small current sufficient to push it into the breakdown region is flowing to it continually by way of diode CR1 and resistor R6 and then through leakage in the emitter-collector circuit of transistor Q2. This arrangement thus functions to compare the voltage drop developed across resistor R3 with the fixed voltage represented by the sum of the fixed voltage across Zener diode CR2 and the much smaller but substantially constant base-emitter forward voltage drop of transistor Q4.

An additional benefit will be gained from this construction in that the voltage reference, which is the sum of the base to emitter voltage of transistor Q4 and the Zener diode CR2, is rendered substantially independent of temperature changes. This benefit is due to the fact that the temperature coefficients of the transistor Q4 and Zener diode CR2 are complementary.

The voltage drop developed across the resistor R3 is dependent upon the voltage at the base of transistor Q1 and thus is dependent upon the voltage developed between terminals 12a and 12b of the battery, i.e., is dependent upon the instantaneous charge attained on the battery, since the voltage at the base of transistor Q1 substantially corresponds to the voltage at the emitter thereof when transistor Q1 is conductive. When the voltage drop developed across the resistor R3 reaches a prescribed level, which is indicative of a prescribed charge being attained on the battery, the Zener diode CR2 breaks down and the base of transistor Q4 is driven positive with respect to the emitter thereof so that transistor Q4 is rendered conductive. When transistor Q4 is conductive, current is drawn thereby through the biasing resistor R2 and a voltage drop is developed across the biasing resistor. When the voltage drop across the biasing resistor R2 exceeds the breakdown or forward conduction level of the diode CR1, the base of transistor Q3 is biased negative with respect to the emitter thereof so that transistor Q3 is rendered conductive. In response thereto, transistor Q2 and transistor Q1 are respectively biased to less conductive states so that less charging current is drawn through the battery 12. Thereafter, as the charge on the battery 12 continues to increase, the base of transistor Q4 is driven more and more positive with respect to the emitter thereof so that transistor Q4 becomes more and more conductive. In response thereto, transistor Q3 becomes more and more conductive so that transistors Q2 and Q1 respectively become less and less conductive resulting in less and less charging current flowing through the battery 12.

In view of the foregoing it will be readily apparent that the battery charging circuit as thus far described causes maximum charging current to flow through the battery 12 until a prescribed charge is attained thereon. The amount of maximum charging current flowing through the battery is dependent upon the bias signal applied to the base of transistor Q2 when the transistor Q3 is nonconductive. Moreover, it will be readily apparent that, when a prescribed charge is attained on the battery, transistor Q4 is rendered conductive. Thereafter, the amount of charging current flowing through the battery 12 is dependent upon the instantaneous charge on the battery and is continuously decreased as the charge on the battery continues to increase. That is, the amount of charging current flowing through the battery 12 becomes inversely proportional to the charge on the battery. Additionally, it will be seen that the transistors Q2–Q4 function as voltage regulation loop which is referenced against the voltage breakdown level of the Zener diode CR2. If the voltage regulation loop is provided with a high gain, firm voltage control is provided thereby and the system is rendered relatively insensitive to transistor parameters so that standard transistors may be employed therein.

In keeping with the present invention, current limiting means are provided for limiting the charging current flow to a prescribed maximum level so as to overcome the uncertainties associated with an uncontrolled current supply. For this purpose a second diode CR3 and a current sensing resistor R7 are associated with the transistor Q3. The diode CR3 is interposed between the base of transistor Q3 and the positive terminal 12a of the battery 12. Thus, the diodes CR1 and CR3 are connected in series with the emitter-base circuit of the transistor Q3. The current sensing resistor R7 is disposed between the anode of diode CR1, which is connected to the positive terminal 11a of the power source, and the cathode of diode CR3, which is connected to the positive terminal 12a of the battery 12. When transistors Q4 and Q3 are nonconductive, transistors Q2 and Q1 are in their maximum conductive states so that maximum charging current is drawn through the battery 12. The charging current flowing through the battery 12 likewise flows through the current sensing resistor R7 causing a plus to minus voltage drop to be developed thereacross as shown in the drawing. If the voltage drop developed across the resistor R7 exceeds the breakdown or forward conduction level of diodes CR1 and CR3, indicating that the charging current flow is exceeding a desired maximum level, the base of transistor Q3 is thereby biased negative with respect to the emitter thereof so that transistor Q3 is rendered conductive. Responsive thereto, transistors Q2 and Q1 are rendered less conductive to reduce the charging current flow through the battery 12.

Thus, it will be apparent that the battery charging circuit constructed in accordance with the teachings of the present invention functions to limit the charging current flow to a desired maximum level, whereby the many uncertainties associated with an uncontrolled current supply are eliminated. Additionally, it will be apparent that transistors Q1, Q2 and Q3 function as a current regulation loop which is referenced against the forward conduction level of diodes CR1 and CR3. If the current regulation loop, like the previously discussed voltage regulation loop, is provided with a high gain, it will be apparent that firm current control is provided and that the loop is relatively insensitive to transistor parameters so that standard transistors may be utilized therein.

In further keeping with the present invention, means are provided for causing the current flow through the battery 12 to be reduced to a "trickle" level once full charge is attained on the battery. For this purpose a current sensing resistor R8 is provided in the connection between positive terminals 11a and 12a respectively of the power source and the battery. Additionally, a pair of diodes CR4 and CR5 are connected in series across the resistor R8. Finally, a PNP type transistor Q5 is associated with this arrangement. As may be seen, the emitter-collector circuit of transistor Q5 is connected in parallel with the resistor R5 in the voltage dividing network (R3–R5). Moreover, the base of transistor Q5 is connected to the common terminal 20 between the diodes CR4 and CR5 and is connected to the emitter of transistor Q4 through a resistor R9. Since resistor R8 is disposed in the connection between terminals 11a and 12a, a portion of the charging current flowing through the battery 12 also flows through the resistor R8 so that a plus-minus voltage drop is developed thereacross as shown in the drawing.

Under normal operating conditions, when the battery 12 is being charged, the voltage drop developed across the resistor R8 exceeds the breakdown or forward conduction level of the diodes CR4 and CR5 so that the base of transistor Q5 is biased positive with respect to the emitter thereof and transistor Q5 is maintained nonconductive. Under such conditions, the emitter-collector circuit of transistor Q5 appears as an open circuit and the transistor Q5 has no effect on the voltage dividing network (R3–R5). However, when the battery 12 becomes fully charged, the charging current flow is reduced to a level, responsive to operation of transistor Q4, whereat the voltage drop developed across the resistor R8 is below the forward conduction level for the diodes CR4 and CR5 conductive. Under these latter conditions, the base of transistor Q5 is biased negative with respect to the emitter thereof since the base is connected to the emitter of transistor Q4 through the resistor R9 and thus is connected to the base of transistor Q1 through the Zener diode CR2 which is in its conductive or broken down condition. Consequently, the transistor Q5 is rendered conductive. Moreover, the resistor R5 in the voltage dividing network is essentially short circuited by the transistor Q5. It follows then that the base of transistor Q4 is driven more positive with respect to the emitter thereof so that transistor Q4 and transisor Q3 are boh rendered more conducive. Responsive thereto, transistor Q2 and Q1 are rendered less conductive and the flow of current through the battery 12 is reduced to a predetermined level which is sufficient to keep a prescribed "float" voltage impressed on the battery 12.

In view of the foregoing it will be seen that a battery charging circuit has been provided which (1) initially supplies charging current to the battery 12 at a limited maximum rate, (2) supplies charging current to the battery at a rate which is inversely proportional to the charge thereon subsequent to the time a prescribed intermediate charge is attained on the battery and until the battery is fully charged and (3) supplies a predetermined lower float voltage to the battery subsequent to full charge being attained thereon.

In a typical application wherein the battery has a nominal voltage of 12 volts, wherein the miximum voltage impressed during charging is to be 15 volts, wherein the "float" voltage impressed after full charge is attained is to be 13.8 volts, and wherein the maximum charging current is to be limited to 800 milliamperes, the component values for the battery charging disclosed herein will be as follows—

| Component: | Type or Value |
|---|---|
| Q1—Transistor | Germanium alloy 2 N-554. |
| Q2—Transistor | Germanium alloy 2 N-1038. |
| Q3 & Q5—Transistors | Germanium alloy 2 N-1307. |
| Q4—Transistor | Silicon 2 N-2711. |
| R1, R2 & R3—Resistors | 2200 ohms. |
| R4—Resistor | 1500 ohms. |
| R5—Resistor | 680 ohms. |
| R6—Resistor | 360 ohms. |
| R7—Resistor | 2 ohms. |
| R8—Resistor | 18 ohms. |
| R9—Resistor | 2700 ohms. |
| CR1 & CR3—Diodes | Silicon IN-676. |
| CR2—Zener Diode | Silicon GE Z 4xL7.5. |
| CR4 & CR5—Diodes | Silicon IN-1487. |

As previously mentioned, practically any standard transistor may be utilized in the battery charging circuit disclosed herein, the transistors only being required to have prerequisite operating characteristics of standard transistors. However, the transistor Q1 which controls the flow of charging current through the battery 12 should be a fairly large germanium alloy transistor. This is desirable since such transistors have slow response times and adequate base to emitter voltage ratings and, thus, provide stability to the control loops of the battery charging circuit and isolate the battery when the input circuit is not connected to the battery charging circuit or is turned off. The transistor Q4 is listed above as being a silicon transistor type 2N–2711 as manufactured by General Electric Company. However, this transistor may be any NPN type germanium transistor provided it has a reverse bias collector current $I_{co}$ which is below a prescribed critical level. With the foregoing components, the critical level is on the order of 10 microamperes.

While the components set forth hereinabove are for a charging circuit which will provide a maximum output of 15 volts and a maximum charging circuit of 800 milliamperes, it will be readily apparent to those skilled in the art that the disclosed battery charging circuit is readily adaptable for conversion to different voltage and current levels as may be required. Under such circumstances, the component values need merely be altered to meet the specific desired charging characteristics.

What is claimed is:

1. In a battery charging circuit, the combination which comprises a source of charging current, means including a first transistor associated with the source for controlling the flow of current to a battery, transistorized means including a resistor disposed between the source and the battery and responsive to the flow of current therethrough for controlling the operation of the first transistor to limit the flow of current to a prescribed maximum rate, transistorized means including a Zener diode responsive to the charge on the battery exceeding a prescribed intermediate charge for controlling the operation of the first transistor to cause current to flow to the battery at a rate dependent upon the charge on the battery until full charge is attained thereon, and transistorized means including a resistor disposed between the battery and the source and responsive to full charge being attained on the battery for controlling the first transistor to cause a voltage to be impressed on the battery at a float level.

2. In a battery charging circuit, the combination which comprises a source of charging current, means including a first transistor for controlling the flow of current to a battery, means including a second transistor for controlling the operation of the first transistor, means including a resistor disposed between the source and the battery and a third transistor for responding to the current flow therethrough for controlling the operation of the second transistor so that the first transistor is controlled thereby to cause current to flow to the battery at a prescribed maximum rate, means including a Zener diode and a fourth transistor for responding to the battery attaining a charge which exceeds a prescribed intermediate charge for regulating the operation of the second transistor so that the first transistor is controlled thereby to cause current to flow to the battery at a rate dependent upon the instantaneous charge on the battery until full charge is attained thereon, and means including a resistor disposed between the source and the battery and a fifth transistor for responding to the current flow therethrough diminishing to a rate indicative of full charge being attained on the battery for causing a voltage to be impressed on the battery at a float level.

3. In a battery charging circuit including a source of charging power coupled to a battery, the combination comprising: measuring means for developing a voltage which varies with the condition of the battery, transistor means responsive to said developed voltage for regulating the current to said battery after said voltage reaches a predetermined level, said regulation being characterized by a decrease in current to the battery with an improvement in the charged condition of the battery, said transistor means including at least one transistor in which the emitter-collector conduction increases with increasing voltage across said battery; and means responsive to the current supplied to the battery for causing emitter-collector conduction in said transistor when the current supplied to the battery exceeds a predetermined value, said means responsive to the current including a resistor positioned in the current path between the source and the battery, a first diode connected from one side of said resistor to the emitter of said transistor and a second diode connected between the other side of said resistor and the base of said transistor.

4. In a battery charging circuit including a source of power coupled to a battery, the combination comprising: a transistor means for controlling the flow of current to the battery, means for measuring the charge on the battery and developing a voltage related thereto, a transistor regulator circuit responsive to the developed voltage including at least one transistor whose conduction increases in response to an increase in said developed voltage, charging current sensing means for increasing said developed voltage when said charging current reaches a first predetermined value, and for increasing the conduction of said transistor when the charging current reaches a second predetermined value, said current sensing means including a resistor positioned in the charging current line, a first diode coupled from one side of said resistor to the emitter of said transistor and a second diode coupled between the other side of said resistor and the base of said transistor.

5. In a battery charging circuit including a source of power coupled to a battery, the combination comprising: a transistor means for controlling the flow of current to the battery, means for measuring the charge on the battery and developing a voltage related thereto, a transistor regulator circuit responsive to the developed voltage including at least a second transistor whose conduction increases in response to an increase in said developed voltage, charging current sensing means for increasing said developed voltage when said charging current reaches a first predetermined value, and for increasing the conduction of said second transistor when the charging current reaches a second predetermined value, said means for measuring including a resistive network and said means for increasing said developed voltage including a third transistor having a base, an emitter and a collector with the emitter-collector path positioned across part of said resistive network, said charging current sensing means including means for increasing the base-emitter conduction of said third transistor when said charging current reaches a predetermined minimum value for maintaining a float current to said battery.

6. In a battery charging circuit including a source of charging power coupled to a battery, the combination comprising: resistive measuring means for developing a voltage which varies with the condition of the battery, first transistor means responsive to said developed voltage for regulating the current to said battery in accordance with said voltage after said voltage reaches a predetermined level, second transistor means coupled to said measuring means and responsive to the current flowing to said battery for changing said developed voltage to decrease the current to the battery after said current falls to a predetermined level whereby a float current is supplied to said battery, said second transistor means including a transistor coupled across a portion of said resistive measuring means to reduce the resistance of said resistive measuring means when the current flowing to the battery falls to a predetermined level.

References Cited
UNITED STATES PATENTS 3,201,681    8/1965    Van Wilgen et al. ___ 320—68 X
3,310,729    3/1967    Burgess et al. _____ 323—22 X LEE T. HIX, *Primary Examiner.*

S. WEINBERG, *Assistant Examiner.*